(12) United States Patent
Kiyosawa et al.

(10) Patent No.: US 7,637,664 B2
(45) Date of Patent: Dec. 29, 2009

(54) COMPOSITE ROLL BEARING

(75) Inventors: Yoshihide Kiyosawa, Nagano (JP); Harushige Aoyagi, Nagano (JP); Hiroki Hanaoka, Nagano (JP)

(73) Assignee: Harmonic Drive Systems, Inc., Tokyo (JP)

( * ) Notice: Subject to any disclaimer, the term of this patent is extended or adjusted under 35 U.S.C. 154(b) by 724 days.

(21) Appl. No.: 10/585,710

(22) PCT Filed: Mar. 30, 2004

(86) PCT No.: PCT/JP2004/004565

§ 371 (c)(1),
(2), (4) Date: Jul. 10, 2006

(87) PCT Pub. No.: WO2005/103515

PCT Pub. Date: Mar. 11, 2005

(65) Prior Publication Data

US 2008/0285905 A1 Nov. 20, 2008

(51) Int. Cl.
*F16C 19/54* (2006.01)
*F16C 33/46* (2006.01)
(52) U.S. Cl. .................. 384/455; 384/452; 384/577
(58) Field of Classification Search ............... 384/452, 384/453, 454, 455, 572, 577, 621, 623
See application file for complete search history.

(56) References Cited

U.S. PATENT DOCUMENTS

| | | | | |
|---|---|---|---|---|
| 1,523,531 A | * | 1/1925 | Bugatti | ..................... 384/454 |
| 3,304,137 A | * | 2/1967 | Strassberg | .................. 384/455 |
| 3,652,141 A | * | 3/1972 | Husten et al. | ............... 384/455 |
| 4,895,461 A | | 1/1990 | Stella | |
| 6,179,474 B1 | * | 1/2001 | Podhajecki | ................. 384/573 |

FOREIGN PATENT DOCUMENTS

| JP | SHO 55-9974 | 1/1980 |
|---|---|---|
| JP | HEI 01-98917 | 7/1989 |
| JP | 06-213230 | 8/1994 |

OTHER PUBLICATIONS

International Search Report dated Aug. 3, 2004 (2 pages).

* cited by examiner

*Primary Examiner*—Thomas R Hannon
*Assistant Examiner*—Justin Krause
(74) *Attorney, Agent, or Firm*—Flynn, Thiel, Boutell & Tanis, P.C.

(57) ABSTRACT

A composite roll bearing (1), comprising an outer ring (2) and an annular inner ring (3) of groove shape in cross section having first, second, and third receiving surfaces (3a, 3b, 3c) facing the both end face inner peripheral portions (2a, 2b) and the circular inner peripheral surface (2c) of the outer ring (2) at specified intervals. A plurality of rollers (4) for thrust bearing are installed between one end face portion (2a) of the outer ring (2) and the first receiving surface (3a) of the inner ring (3) and between the other end face (2b) of the outer ring (2) and the second receiving surface (3b) of the inner ring (3). A plurality of rollers (5) for radial bearing are installed between the circular inner peripheral surface (2c) of the outer ring (2) and the third receiving surface (3c) of the inner ring (3). The rollers (5) are restricted to move in a thrust direction by retainer portions (8a, 8a) formed at the inner ends of retainers (6, 7) for the rollers (4) for thrust bearing.

12 Claims, 5 Drawing Sheets

(c) (b) (a)

( PRIOR ART )

COMPOSITE ROLL BEARING

TECHNICAL FIELD

The present invention relates to a composite roll bearing that can bear loads in the radial direction and in the thrust direction. The present invention particularly relates to a composite roll bearing that has low frictional resistance and that is easily manufactured.

BACKGROUND ART

One commonly known example of a bearing for a rotating table of a machine tool or the like is a composite-type cylindrical roll bearing that can bear loads in both the radial and thrust directions. As shown in FIG. 5, a composite cylindrical roll bearing 100 has an annular outer ring 102 and an annular inner ring 103 having a groove-shaped cross section, and the inner ring comprises first, second, and third receiving surfaces 103a, 103b, 103c that face the inner peripheral portions 102a, 102b at both ends of the outer ring 102 and that also face a circular inner peripheral surface 102c of the outer ring at specified intervals. Thrust bearing rollers 104 for bearing thrust loads are located between the inner peripheral portion 102a at one end of the outer ring 102 and the first receiving surface 103a of the inner ring 103, and also between the inner peripheral portion 102b at the other end of the outer ring 102 and the second receiving surface 103b of the inner ring 103. Radial bearing rollers 105 for bearing radial loads are located between the circular inner peripheral surface 102c of the outer ring 102 and the third receiving surface 103c of the inner ring 103.

The inner ring 103 comprises a main portion 110 on which the second and third receiving surfaces 103b, 103c are formed, and an annular plate member 111 on which the first receiving surface 103a is formed. The plate member 111 is fixed in place on the main portion 110 by a bolt 112.

The thrust bearing rollers 104 are held by retainers 107 in a rollable state between the inner peripheral portion 102a at one end of the outer ring 102 and the first receiving surface 103a of the inner ring 103, and also between the inner peripheral portion 102b at the other end of the outer ring 102 and the second receiving surface 103b of the inner ring 103. The radial bearing rollers 105 are held in a rollable state between the circular inner peripheral surface 102c of the outer ring 102 and the third receiving surface 103c of the inner ring 103. The rollers are held by annular concavities 109 that have rectangular cross sections and are formed in the third receiving surface 103c of the inner ring 103. Also, the side portions on both sides of the annular concavities 109 allow for positioning in the thrust direction (in the direction of the center line L of the bearing 100).

In the composite cylindrical roll bearing 100 thus configured, the radial bearing rollers 105 are held by the annular concavities 109 formed in the inner ring 103. Therefore, when the inner ring 103 rotates, the radial bearing rollers 105 rotate while revolving around the annular concavities 109. This leads to problems in that sliding frictional force arises between the rollers 105 and the annular concavities 109, and a large amount of frictional force acts on the rollers 105.

Also, since the bottom surfaces and both side surfaces of the annular concavities 109 formed in the third receiving surface 103c of the inner ring 103 are race surfaces in which the rollers 105 move, these surfaces must be formed with a high degree of precision. It is difficult to machine such annular concavities 109 with a high degree of precision compared to cases in which a circular outer peripheral surface or a circular inner peripheral surface is machined into a race surface. If the annular concavities 109 cannot be finished with a high degree of precision, then problems are created in that highly precise positioning is not possible in cases in which the composite cylindrical roll bearing 100 is incorporated into a rotating table of a machine tool or the like.

DISCLOSURE OF THE INVENTION

An object of the present invention is to provide a composite roll bearing wherein there is no need to form annular concavities for holding the rolling objects for radial bearing, and wherein the frictional resistance of the rolling objects can be reduced.

Aimed at attaining the stated objects, the composite roll bearing of the present invention is characterized in comprising:

a first race ring having a circular inner peripheral surface and end-surface portions that are linked to both ends of the circular inner peripheral surface;

a second race ring formed with a groove-shaped cross-sectional portion having a first receiving surface that faces one of the end-surface portions at specified intervals, a second receiving surface that faces the other of the end-surface portions at specified intervals, and a third receiving surface that faces the circular inner peripheral surface at specified intervals;

a plurality of first rolling objects for thrust bearing that are installed in a first annular race for thrust bearing restricted by one of the end-surface portions and the first receiving surface;

a plurality of second rolling objects for thrust bearing that are installed in a second annular race for thrust bearing restricted by the other of the end-surface portions and the second receiving surface;

a plurality of third rolling objects for radial bearing that are installed in a third annular race for radial bearing restricted by the circular inner peripheral surface and the third receiving surface;

a first retainer for thrust bearing that holds the first rolling objects in a rollable state in the first annular race;

a second retainer for thrust bearing that holds the second rolling objects in a rollable state in the second annular race; and third retainer portions for radial bearing that extend from the ends of the first retainer and the second retainer in the third annular race, and that holds the third rolling objects in a rollable state in this race.

The second race ring can comprise a first annular member having an end surface on which the first receiving surface is formed, a second annular member having an end surface on which the second receiving surface is formed, and a third annular member that is coaxially sandwiched between the first annular member and the second annular member and that has a circular outer peripheral surface on which the third receiving surface is formed.

Also, the first and second retainers for thrust bearing can comprise holding holes (pockets) for holding the first and second rolling objects in a rotatable state at fixed angular intervals along the circumferential direction.

Furthermore, the configuration can have the third rolling objects held between the distal end surface of the third retainer portion formed on the first retainer, and the distal end surface of the third retainer portion formed on the second retainer.

Alternatively, the third retainer portion formed on the first retainer, and the third retainer portion formed on the second retainer can be linked together in a detachable state, and between these portions can be formed holding holes for holding the third rolling objects in a rollable state at fixed angular intervals along the circumferential direction.

Cylindrical rollers can be used as the rolling objects for the thrust bearing and radial bearing.

Next, the composite roll bearing of the present invention is characterized in comprising:

a first race ring having a circular outer peripheral surface and end-surface portions that are linked to both ends of the circular outer peripheral surface;

a second race ring formed with a groove-shaped cross-sectional portion having a first receiving surface that faces one of the end-surface portions at specified intervals, a second receiving surface that faces the other of the end-surface portions at specified intervals, and a third receiving surface that faces the circular outer peripheral surface at specified intervals;

a plurality of first rolling objects for thrust bearing that are installed in a first annular race for thrust bearing restricted by one of the end-surface portions and the first receiving surface;

a plurality of second rolling objects for thrust bearing that are installed in a second annular race for thrust bearing restricted by the other of the end-surface portions and the second receiving surface;

a plurality of third rolling objects for radial bearing that are installed in a third annular race for radial bearing restricted by the circular outer peripheral surface and the third bearing surface;

a first retainer for thrust bearing that holds the first rolling objects in a rollable state in the first annular race;

a second retainer for thrust bearing that holds the second rolling objects in a rollable state in the second annular race; and third retainer portions for radial bearing that extend from the ends of the first retainer and the second retainer in the third annular race, and that holds the third rolling objects in a rollable state in this race.

The second race ring can comprise a first annular member having an end surface on which the first receiving surface is formed, a second annular member having an end surface on which the second receiving surface is formed, and a third annular member that is coaxially sandwiched between the first annular member and the second annular member and that has a circular inner peripheral surface on which the third receiving surface is formed.

Also, the first and second retainers for thrust bearing can comprise holding holes (pockets) for holding the first and second rolling objects in a rotatable state at fixed angular intervals along the circumferential direction.

Furthermore, the configuration can have the third rolling objects held between the distal surface of the third retainer portion formed on the first retainer, and the distal surface of the third retainer portion formed on the second retainer.

Alternatively, the third retainer portions for radial bearing on the first and second retainers can be linked together in a detachable state, and between these portions can be formed holding holes for holding the third rolling objects in a rotatable state at fixed angular intervals along the circumferential direction.

Furthermore, cylindrical rollers can be used as the rolling objects for thrust bearing and radial bearing.

Figure 1:
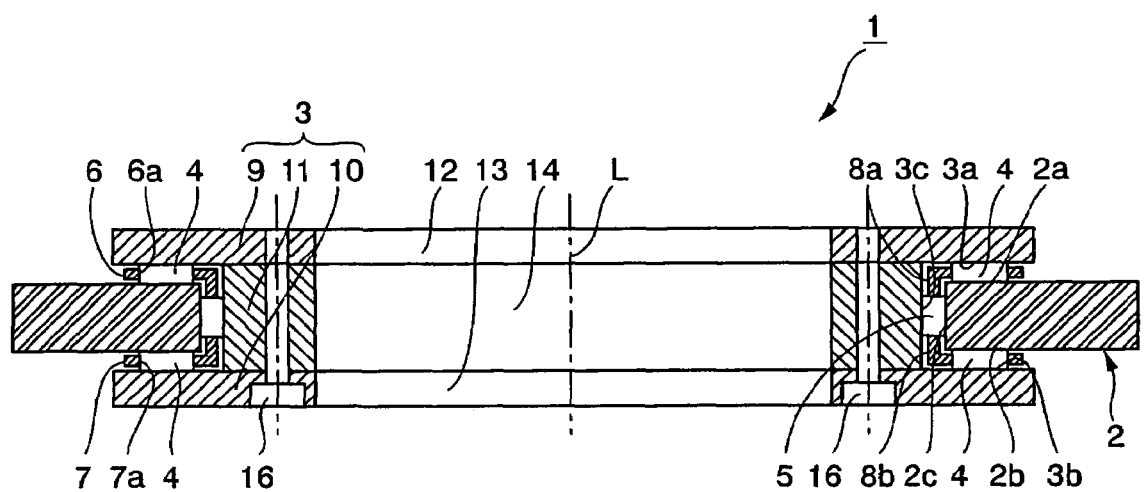
FIG. 1 is a cross-sectional view of the composite roll bearing according to the present invention.

DESCRIPTION OF NUMERICAL SYMBOLS 1, 1A composite roll bearing, 2 outer ring (first race ring)
2a, 2b end surfaces, 2c circular inner peripheral surface
2A outer ring (second race ring), 2d first receiving surface
2e second receiving surface, 2f third receiving surface
3 inner ring (second race ring), 3a first receiving surface
3b second receiving surface, 3c third receiving surface
3A inner ring (first race ring), 3d, 3e end surfaces
3f circular outer peripheral surface, 4 rollers, 5 rollers
6, 6A, 7, 7A retainers, 8a, 8b retainer portions
9 first annular member, 10 second annular member
11 third annular member, 17 annular end plate portion
18 circular inner peripheral plate portion, 24 first annular member
25 second annular member, 26 third annular member

BEST MODE FOR CARRYING OUT THE INVENTION

A composite roll bearing in which the present invention is applied will now be described with reference to the drawings.

Embodiment 1

Figure 2:
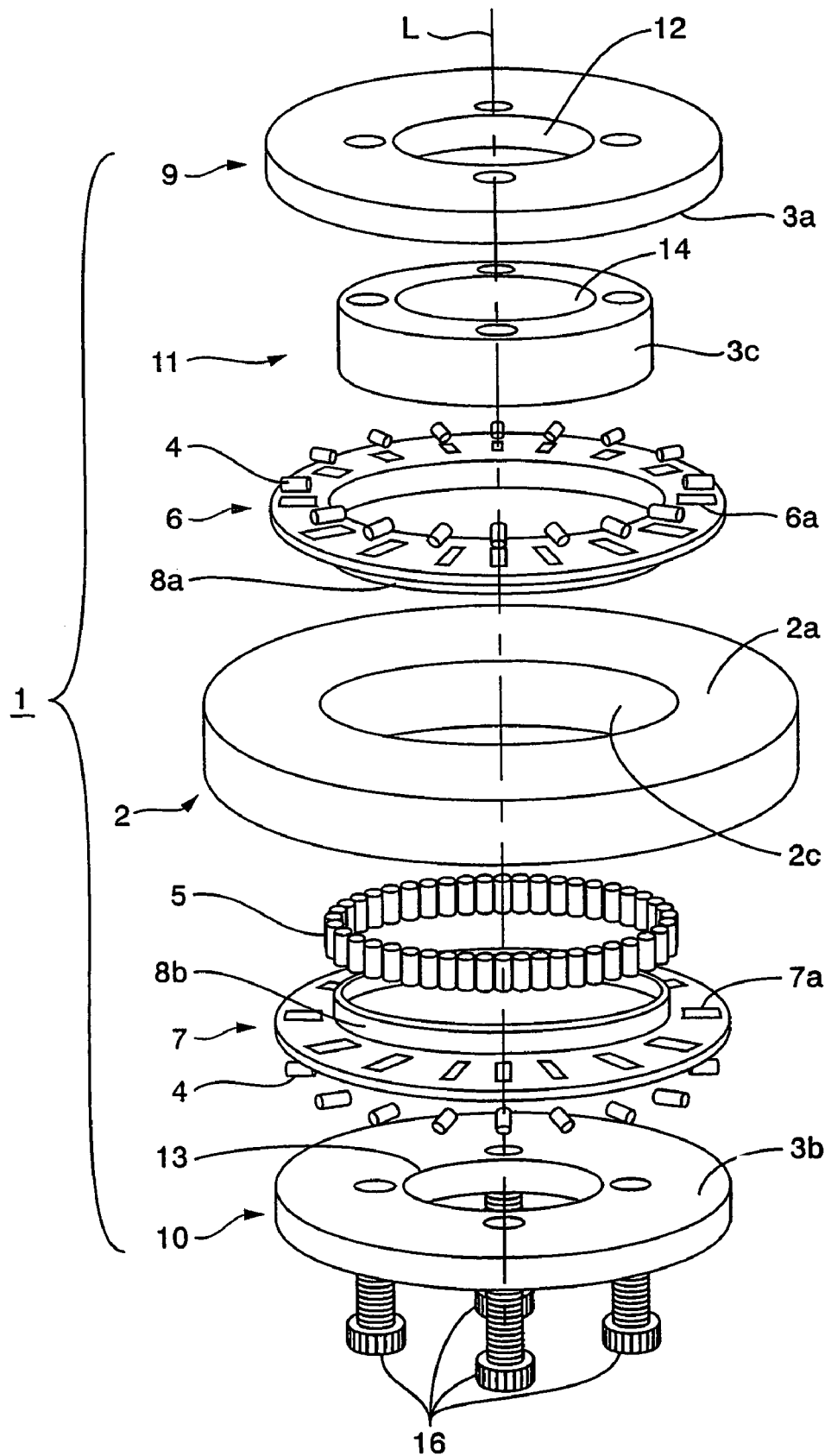
FIG. 2 is an exploded perspective view of the composite roll bearing in FIG. 1.

FIG. 1 is a cross-sectional view of a composite roll bearing according to the present invention, and FIG. 2 is an exploded perspective view thereof. As shown in these diagrams, a composite roll bearing 1 has an annular outer ring (first race ring) 2 comprising a circular inner peripheral surface 2c, and also comprising end-surface portions 2a, 2b linked to both ends of the circular inner peripheral surface 2c. The bearing also has an annular inner ring (second race ring) 3 in which a groove-shaped cross-sectional portion is formed and which comprises a first receiving surface 3a that faces the end-surface portion 2a at specified intervals, a second receiving surface 3b that faces the other end-surface portion 2b at specified intervals, and a third receiving surface 3c that faces the circular inner peripheral surface 2c at specified intervals.

FIG. 1 first annular race for thrust bearing is restricted by the end-surface portion 2a of the outer ring 2 and the first receiving surface 3a of the inner ring 3, and cylindrical rollers 4 (first rolling objects) for thrust bearing are installed in this race. Similarly, a second annular race for thrust bearing is restricted by the other end-surface portion 2b of the outer ring 2 and the second receiving surface 3b of the inner ring 3, and cylindrical rollers 4 (second rolling objects) for thrust bearing are also installed in this race. A third annular race for radial bearing is restricted by the circular inner peripheral surface 2c of the outer ring 2 and the third receiving surface 3c of the inner ring 3, and cylindrical rollers 5 (third rolling objects) for radial bearing are also installed in this race. In the present example, radial bearings composed entirely of rollers are provided in order to improve load capacity and reduce skewing.

Also, a first retainer 6 for thrust bearing is installed in the first annular race for thrust bearing. Roller holding holes 6a are formed in the first retainer 6 at fixed angular intervals along the circumferential direction, and the rollers 4 are held in the roller holding holes 6a in a rollable state. Similarly, a second retainer 7 for thrust bearing is installed in the other second annular race for thrust bearing, and roller holding holes 7a are formed in this retainer at fixed angular intervals along the circumferential direction. The rollers 4 are held in the roller holding holes 7a in a rollable state.

A third retainer portion 8a for thrust bearing, which protrudes in annular shape towards the inside of the third annular race for radial bearing, is integrally formed on the inner end of the first retainer 6. Similarly, a third retainer portion 8b for thrust bearing, which protrudes in annular shape towards the inside of the third annular race, is integrally formed on the inner end of the other second retainer 7. The positions of the rollers 5 for radial bearing in the thrust direction (in the direction of the bearing center line L) are restricted by the third retainer portions 8a, 8b, and the rollers 5 are held in a rollable state between these portions.

Next, the inner ring 3 comprises a large first annular member 9 on which the first receiving surface 3a is formed, a second annular member 10 on which the second receiving surface 3b is formed and which is equal in size to the annular member 9, and a small third annular member 11 sandwiched between the first two annular members 9, 10. The circular outer peripheral surface of the third annular member 11 constitutes the third receiving surface 3c. Axle holes 12, 13, 14 of equal size are formed coaxially in the center of the annular members 9 through 11. Also, the annular members 9 through 11 are fastened and fixed in place by fastening bolts 16.

The composite roll bearing 1 thus configured is used, for example, with the outer ring 2 fixed in place in the bearing unit of a rotating table of a machine tool, and the inner ring 3 fixed in place on the rotating axle of the rotating table. In the composite roll bearing 1 of the present example, part of the first and second retainers that hold the rollers 4 for thrust bearing are used to hold the rollers 5 for radial bearing. Consequently, there is no need to form annular concavities for holding rollers on the race surface (receiving surface 3c) for radial bearing, as is the case in the prior art. Consequently, machining is easier to perform because the receiving surface 3c of the inner ring 3 can be fashioned into a simple circular outer peripheral surface. As a result, the receiving surface 3c can be finished with a high degree of precision, and machining costs can be reduced.

Also, the rollers 5 for radial bearing are held by the third retainer portions 8a, 8b formed on the first and second retainers 6, 7. Since the rotational speed of the retainers 6, 7 is close to the revolving speed of the rollers 5, the sliding frictional resistance of the rollers 5 can be reduced compared to cases in which the rollers 5 are held in annular concavities formed in the inner ring 3.

Cylindrical rollers are used as the rolling objects, but rolling objects of other shapes can also be used.

Figure 3:
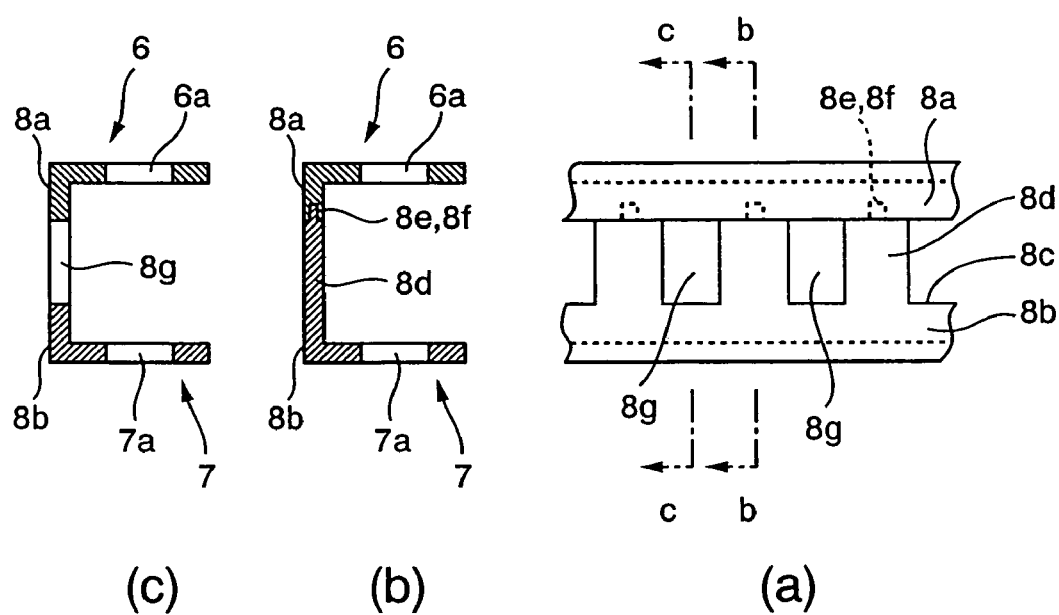
FIGS. 3(a) through (c) are, respectively, a partial plan development view depicting another example of a retainer, a cross-sectional view of the portion segmented along line b-b, and a cross-sectional view of the portion segmented along line c-c.

It is also possible for the holding holes in the rollers 5 for radial bearing to be formed by the retainer portions 8a, 8b. For example, protuberances 8d in the shape of comb teeth can be formed at fixed intervals from the distal surface 8c of one retainer portion 8b, as shown in FIG. 3. Engaging protuberances 8e are formed at the distal ends of these protuberances 8d. Engaging grooves 8f for accepting the engaging protuberances 8e are formed in the distal surface of the other retainer portion 8a. Holding holes 8g for the rollers 5 are formed as a result of these two retainer portions 8a, 8b being linked together.

Embodiment 2

Figure 4:
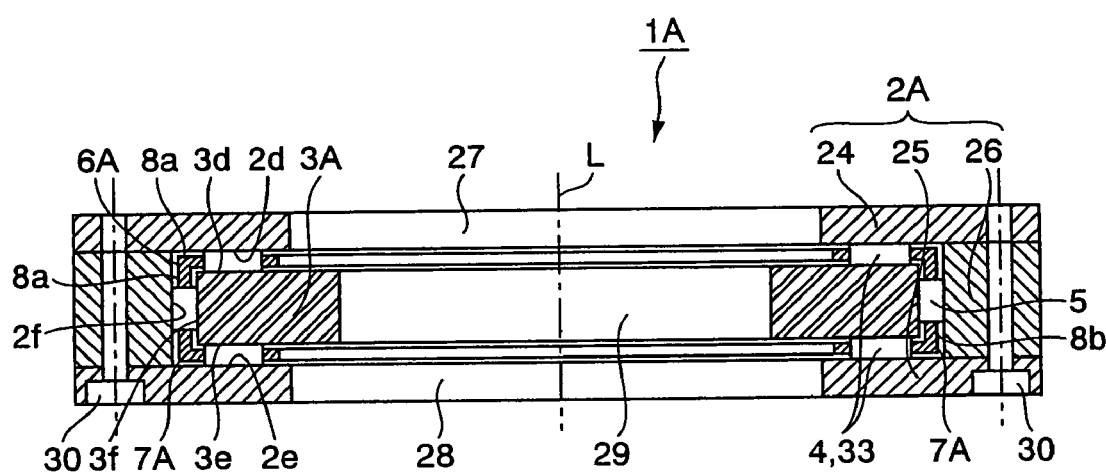
FIG. 4 is a cross-sectional view depicting another embodiment of a composite roll bearing.
Figure 5:
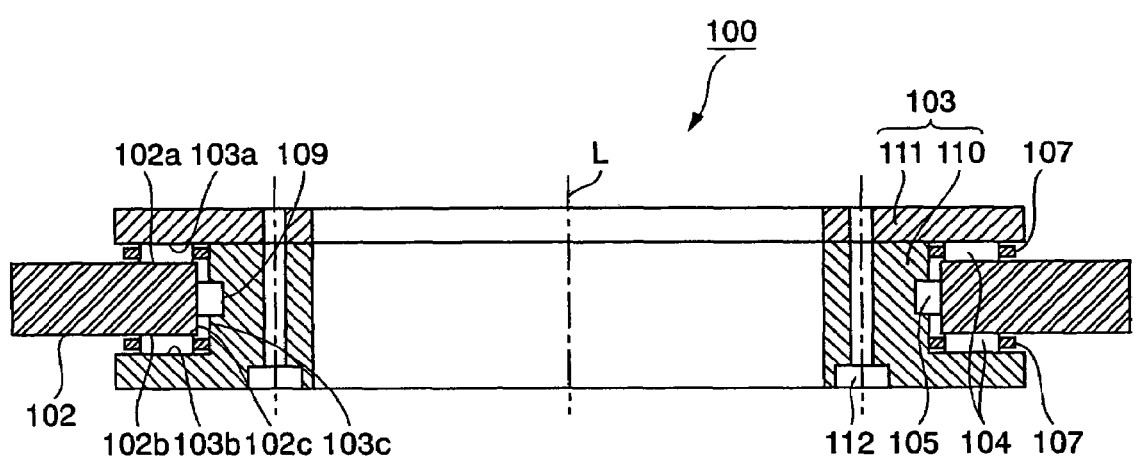
FIG. 5 is a cross-sectional view of a conventional composite roll bearing.

FIG. 4 is a cross-sectional view depicting another example of the composite roll bearing 1. The composite roll bearing 1A of the present example has an annular inner ring (first race ring) 3A, and an annular outer ring 2A (second race ring) having a groove-shaped cross section. The outer ring comprises first, second, and third receiving surfaces 2d, 2e, 2f that are placed opposite, and are separated by specified intervals from, outer peripheral side portions 3d, 3e at both end surfaces of the inner ring 3A, and from a circular outer peripheral surface 3f.

Thrust bearing rollers 4 capable of supporting thrust loads are located between one end-surface outer peripheral portion 3d of the inner ring 3A and the first receiving surface 2d of the outer ring 2A, and also between the other end-surface outer peripheral portion 3e of the inner ring 3A and the second receiving surface 2e of the outer ring 2A. Radial bearing rollers 5 capable of supporting radial loads are located between the circular outer peripheral surface 3f of the inner ring 3A and the third receiving surface 2f of the outer ring 2A. These rollers 4 and 5 are held in a rollable state by the pair of retainers 6, 7.

The outer ring 2A of the present example comprises a first annular member 24 on which the first receiving surface 2d is formed, a second annular member 25 on which the second receiving surface 2e is formed, and a third annular member 26 sandwiched between these annular members 24, 25; and the circular inner peripheral surface of the third annular member 26 functions as the third receiving surface 2f. These annular members 24 through 26 are equal in outside diameter. Also, the diameters of through-holes 27, 28 in the centers of the annular members 24, 25 are larger than the diameter of an axle hole 29 in the inner ring 3A. The annular members 24 through 26 are superposed and fixed in place by a fastening bolt 30.

The third retainer portions 8a, 8b for radial bearing are formed on the outer ends of the first and second retainers 6A, 7A for thrust bearing, and the positions of the rollers 5 in the thrust direction are restricted by these retainer portions 8a, 8b.

Using the composite roll bearing 1A of the present example yields the same operating effects as using the composite roll bearing 1 described above.

Cylindrical rollers were used as the rolling objects, but rolling objects of other shapes can also be used.

INDUSTRIAL APPLICABILITY

In the composite roll bearing of the present invention, third retainer portions for radial bearing are formed on the ends of the first and second retainers for thrust bearing. Therefore, there is no need for annular concavities for positioning the radial-bearing rolling objects in the thrust direction to be formed in the race surfaces of the race rings, as in conventional practice.

The radial-bearing rolling objects are held by the retainers, and the rotating speed of the retainers is close to the revolving speed of the rolling objects. Consequently, the sliding frictional force that acts on the rolling objects can be reduced compared to cases in which the rolling objects are held in annular concavities formed in the race surfaces. Manufacturing is also made easier because there is no need to subsequently machine annular concavities into the race surfaces for radial bearing.

The invention claimed is:

1. A composite roll bearing, comprising:
a first race ring having a circular inner peripheral surface and end-surface portions that are linked to both ends of the circular inner peripheral surface;
a second race ring formed with a groove-shaped cross-sectional portion having a first receiving surface that faces one of the end-surface portions at a specified interval, a second receiving surface that faces the other of the end-surface portions at a specified interval, and a third receiving surface that faces the circular inner peripheral surface at a specified interval;
a plurality of first rolling objects for thrust bearing that are installed in a first annular race for thrust bearing defined by one of the end-surface portions and the first receiving surface;
a plurality of second rolling objects for thrust bearing that are installed in a second annular race for thrust bearing defined by the other of the end-surface portions and the second receiving surface;
a plurality of third rolling objects for radial bearing that are installed in a third annular race for radial bearing defined by the circular inner peripheral surface and the third receiving surface;
a first retainer that holds the first rolling objects in a rollable state in the first annular race;
a second retainer that holds the second rolling objects in a rollable state in the second annular race; and
third and fourth retainer portions that extend from the ends of the first retainer and the second retainer, respectively, in the third annular race, and that hold the third rolling objects in a rollable state in the third annular race.

2. The composite roll bearing according to claim 1, wherein the second race ring comprises:
a first annular member having an end surface on which the first receiving surface is formed;
a second annular member having an end surface on which a second receiving surface is formed; and
a third annular member that is coaxially sandwiched between the first annular member and the second annular member and that has a circular outer peripheral surface on which a third receiving surface is formed.

3. The composite roll bearing according to claim 1, wherein
the first and second retainers comprise holding holes for holding the first and second rolling objects in a rotatable state at fixed angular intervals along a circumferential direction.

4. The composite roll bearing according to claim 1, wherein
the third rolling objects are held between a distal end surface of the third retainer portion formed on the first retainer, and a distal end surface of the fourth retainer portion formed on the second retainer.

5. The composite roll bearing according to claim 1, wherein
the third retainer portion formed on the first retainer and the fourth retainer portion formed on the second retainer are linked together in a detachable state, and between the third and fourth retainer portions are formed holding holes for holding the third rolling objects in a rollable state at fixed angular intervals along a circumferential direction.

6. The composite roll bearing according to claim 1, wherein
the first, second, and third rolling objects are cylindrical rollers.

7. A composite roll bearing comprising:
a first race ring comprising a circular outer peripheral surface and end-surface portions that are linked to both ends of the circular outer peripheral surface;
a second race ring formed with a groove-shaped cross-sectional portion having a first receiving surface that faces one of the end-surface portions at specified intervals, a second receiving surface that faces the other of the end-surface portions at specified intervals, and a third receiving surface that faces the circular outer peripheral surface at specified intervals;
a plurality of first rolling objects for thrust bearing that are installed in a first annular race for thrust bearing defined by one of the end-surface portions and the first receiving surface;
a plurality of second rolling objects for thrust bearing that are installed in a second annular race for thrust bearing defined by the other of the end-surface portions and the second receiving surface;
a plurality of third rolling objects for radial bearing that are installed in a third annular race for radial bearing defined by the circular outer peripheral surface and the third receiving surface;
a first retainer that holds the first rolling objects in a rollable state in the first annular race;
a second retainer that holds the second rolling objects in a rollable state in the second annular race; and
third and fourth retainer portions that extend from the ends of the first retainer and the second retainer respectively in the third annular race, and that hold the third rolling objects in a rollable state in the third annular race.

8. The composite roll bearing according to claim 7, wherein the second race ring comprises:
a first annular member having an end surface on which the first receiving surface is formed;
a second annular member having an end surface on which a second receiving surface is formed; and
a third annular member that is sandwiched coaxially between the first annular member and the second annular member and that has a circular inner peripheral surface on which a third receiving surface is formed.

9. The composite roll bearing according to claim 7, wherein
the first and second retainers comprise holding holes for holding the first and second rolling objects in a rotatable state at fixed angular intervals along a circumferential direction.

10. The composite roll bearing according to claim 7, wherein
the third rolling objects are held between the distal end surface of the third retainer portion formed on the first retainer, and the distal end surface of the fourth retainer portion formed on the second retainer.

11. The composite roll bearing according to claim 7, wherein
the third retainer portion formed on the first retainer and the fourth retainer portion formed on the second retainer are linked together in a detachable state, and between the third and fourth retainer portions are formed holding holes for holding the third rolling objects in a rotatable state at fixed angular intervals along a circumferential direction.

12. The composite roll bearing according to claim 7, wherein
the first, second, and third rolling objects are cylindrical rollers.

* * * * *